(12) United States Patent
Zhu et al.

(10) Patent No.: US 11,805,474 B2
(45) Date of Patent: Oct. 31, 2023

(54) UE BEAM DETECTION

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/912,623

(22) Filed: Jun. 25, 2020

(65) Prior Publication Data

US 2020/0412434 A1 Dec. 31, 2020

Related U.S. Application Data

(60) Provisional application No. 62/868,826, filed on Jun. 28, 2019.

(51) Int. Cl.
*H04W 56/00* (2009.01)
*H04W 24/10* (2009.01)
(Continued)

(52) U.S. Cl.
CPC .......... *H04W 48/16* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS

| 2018/0205585 A1* | 7/2018 | Sadiq | H04B 7/088 |
| 2018/0248601 A1* | 8/2018 | Kishiyama | H04B 7/0632 |

(Continued)

FOREIGN PATENT DOCUMENTS

| WO | WO-2018017840 A1 | 1/2018 |
| WO | WO-2018068723 A1 | 4/2018 |

(Continued)

OTHER PUBLICATIONS

International Search Report and Written Opinion—PCT/US2020/039905—ISA/EPO—dated Oct. 7, 2020 (193222WO).

*Primary Examiner* — Scott M Sciacca
(74) *Attorney, Agent, or Firm* — Holland & Hart LLP

(57) ABSTRACT

Methods, systems, and devices for wireless communications are described. A user equipment (UE) may performing a search procedure using a first receive beam. The UE may detect, based on performing the search procedure, a synchronization signal block corresponding to a transmit beam in a first synchronization signal burst set transmitted by a base station. The UE may perform a measurement procedure on a second synchronization signal burst set using a second receive beam to measure the transmit beam, where the second synchronization signal burst set is transmitted subsequently to the first synchronization signal burst set. In some cases, the UE may perform a measurement procedure for each configured receive beam. The UE may perform a beam refinement procedure after measuring each configured receive beam.

28 Claims, 12 Drawing Sheets

(51) Int. Cl.
    *H04B 7/08*      (2006.01)
    *H04B 17/318*    (2015.01)
    *H04W 48/16*     (2009.01)
    *H04B 7/06*      (2006.01)
    *H04W 72/30*     (2023.01)
    *H04L 27/26*     (2006.01)

(52) U.S. Cl.
    CPC .......... *H04B 17/318* (2015.01); *H04W 24/10* (2013.01); *H04W 56/001* (2013.01); *H04W 72/30* (2023.01); *H04L 27/2613* (2013.01)

(56) References Cited

U.S. PATENT DOCUMENTS

| | | |
|---|---|---|
| 2018/0324022 A1 | 11/2018 | Sheng et al. |
| 2018/0324678 A1 | 11/2018 | Chen et al. |
| 2019/0037427 A1* | 1/2019 | Yerramalli ........ H04W 36/0061 |
| 2020/0366360 A1* | 11/2020 | Kotecha ................. H04B 7/088 |

FOREIGN PATENT DOCUMENTS

| | | |
|---|---|---|
| WO | WO-2018144337 A1 | 8/2018 |
| WO | WO-2020097813 A1 * | 5/2020 |
| WO | WO-2020117900 A1 | 6/2020 |

\* cited by examiner

UE BEAM DETECTION

CROSS REFERENCE

The present application for patent claims the benefit of U.S. Provisional Patent Application No. 62/868,826 by ZHU et al., entitled "UE BEAM DETECTION," filed Jun. 28, 2019, assigned to the assignee hereof, and expressly incorporated by reference herein.

BACKGROUND

The following relates generally to wireless communications, and more specifically to UE beam detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may monitor for synchronization signals to connect to a cell provided by a base station. Once the cell is detected, the UE may use techniques to detect beams on the cell. Conventional techniques for detecting beams at a UE may be deficient and can be improved.

SUMMARY

The described techniques relate to improved methods, systems, devices, and apparatuses that support user equipment (UE) beam detection. Generally, the described techniques provide for using measurement procedures for UE beam detection. The UE 115 may use a first receive beam to perform a search procedure for a synchronization signal block (SSB) from a base station 105. The UE 115 may detect an SSB corresponding to a transmit beam of the base station 105, which may trigger UE beam detection. The UE 115 may use each other receive beam to perform measurement procedures in a beam sweep based on detecting the beam (e.g., the transmit beam) of base station 105. To perform the measurement procedures, the UE 115 may use timing information for the SSB and transmit beam determined from the search procedure. The UE 115 may perform measurement procedures on the transmit beam for subsequent synchronization signal burst set (SSBS) and detect other receive beams. The UE 115 may measure different receive beams in following or subsequent (e.g., back-to-back) SSBS. The UE 115 may then quickly populate a measurement database with measurements for the receive beams. This may enable the UE 115 to trigger beam refinement sooner and select a narrowband beam, which may improve communications performance. In an example, the UE 115 may populate the measurement database with reference signal received power (RSRP) on each configured pseudo-omnidirectional beam and find the best pseudo-omnidirectional beam for further UE beam refinement.

A method of wireless communication at a UE is described. The method may include performing a search procedure using a first receive beam, detecting, based on performing the search procedure, a synchronization signal block corresponding to a transmit beam in a first synchronization signal burst set transmitted by a base station, and performing a measurement procedure on a second synchronization signal burst set using a second receive beam to measure the transmit beam, where the second synchronization signal burst set is transmitted subsequently to the first synchronization signal burst set.

An apparatus for wireless communication at a UE is described. The apparatus may include a processor, memory coupled with the processor, and instructions stored in the memory. The instructions may be executable by the processor to cause the apparatus to perform a search procedure using a first receive beam, detect, based on performing the search procedure, a synchronization signal block corresponding to a transmit beam in a first synchronization signal burst set transmitted by a base station, and perform a measurement procedure on a second synchronization signal burst set using a second receive beam to measure the transmit beam, where the second synchronization signal burst set is transmitted subsequently to the first synchronization signal burst set.

Another apparatus for wireless communication at a UE is described. The apparatus may include means for performing a search procedure using a first receive beam, detecting, based on performing the search procedure, a synchronization signal block corresponding to a transmit beam in a first synchronization signal burst set transmitted by a base station, and performing a measurement procedure on a second synchronization signal burst set using a second receive beam to measure the transmit beam, where the second synchronization signal burst set is transmitted subsequently to the first synchronization signal burst set.

A non-transitory computer-readable medium storing code for wireless communication at a UE is described. The code may include instructions executable by a processor to perform a search procedure using a first receive beam, detect, based on performing the search procedure, a synchronization signal block corresponding to a transmit beam in a first synchronization signal burst set transmitted by a base station, and perform a measurement procedure on a second synchronization signal burst set using a second receive beam to measure the transmit beam, where the second synchronization signal burst set is transmitted subsequently to the first synchronization signal burst set.

In some examples of the method, apparatuses, and non-transitory computer-readable medium described herein, performing the search procedure may include operations, features, means, or instructions for receiving the synchronization signal block using the first receive beam, where detecting the synchronization signal block may be based on the receiving, and measuring reference signals in a primary synchronization signal (PSS), a physical broadcast channel (PBCH), and a secondary synchronization signal (SSS) of the synchronization signal block.

In some examples of the method, apparatuses, and non-transitory computer-readable medium described herein, performing the measurement procedure may include operations, features, means, or instructions for measuring reference signals in a SSS in the second synchronization signal burst set.

Some examples of the method, apparatuses, and non-transitory computer-readable medium described herein may further include operations, features, means, or instructions for entering a measurement value for the second receive beam in a measurement database based on performing the measurement procedure.

In some examples of the method, apparatuses, and non-transitory computer-readable medium described herein, the measurement value includes a RSRP associated with the second receive beam and the transmit beam.

Some examples of the method, apparatuses, and non-transitory computer-readable medium described herein may further include operations, features, means, or instructions for performing a set of measurement procedures for each configured receive beam as part of a beam sweep based on detecting the synchronization signal block.

Some examples of the method, apparatuses, and non-transitory computer-readable medium described herein may further include operations, features, means, or instructions for performing a set of measurement procedures on a set of synchronization signal burst sets using a set of receive beams to measure the transmit beam, where the set of receive beams includes the second receive beam, the set of synchronization signal burst sets includes the second synchronization signal burst set, and the set of synchronization signal burst sets may be transmitted subsequent to the first synchronization signal burst set.

Some examples of the method, apparatuses, and non-transitory computer-readable medium described herein may further include operations, features, means, or instructions for triggering a beam refinement procedure based on the set of measurement procedures.

Some examples of the method, apparatuses, and non-transitory computer-readable medium described herein may further include operations, features, means, or instructions for selecting a narrowband receive beam for the transmit beam based on a set of measurements taken for the corresponding set of measurement procedures.

Some examples of the method, apparatuses, and non-transitory computer-readable medium described herein may further include operations, features, means, or instructions for determining timing information for the synchronization signal block based on the search procedure, where performing the measurement procedure may be based on the timing information.

In some examples of the method, apparatuses, and non-transitory computer-readable medium described herein, the first receive beam and the second receive beam may be each a pseudo-omni receive beam.

In some examples of the method, apparatuses, and non-transitory computer-readable medium described herein, the search procedure may be performed during a first search occasion, and the measurement procedure may be performed prior to a second search occasion subsequent to the first search occasion.

Some examples of the method, apparatuses, and non-transitory computer-readable medium described herein may further include operations, features, means, or instructions for detecting the transmit beam of the base station based on performing the search procedure, and triggering the measurement procedure based on the detecting.

Some examples of the method, apparatuses, and non-transitory computer-readable medium described herein may further include operations, features, means, or instructions for determining there may be no entry associated with the transmit beam for the second receive beam in a measurement database, where the measurement procedure may be performed based on the determining.

DETAILED DESCRIPTION

Figure 1:
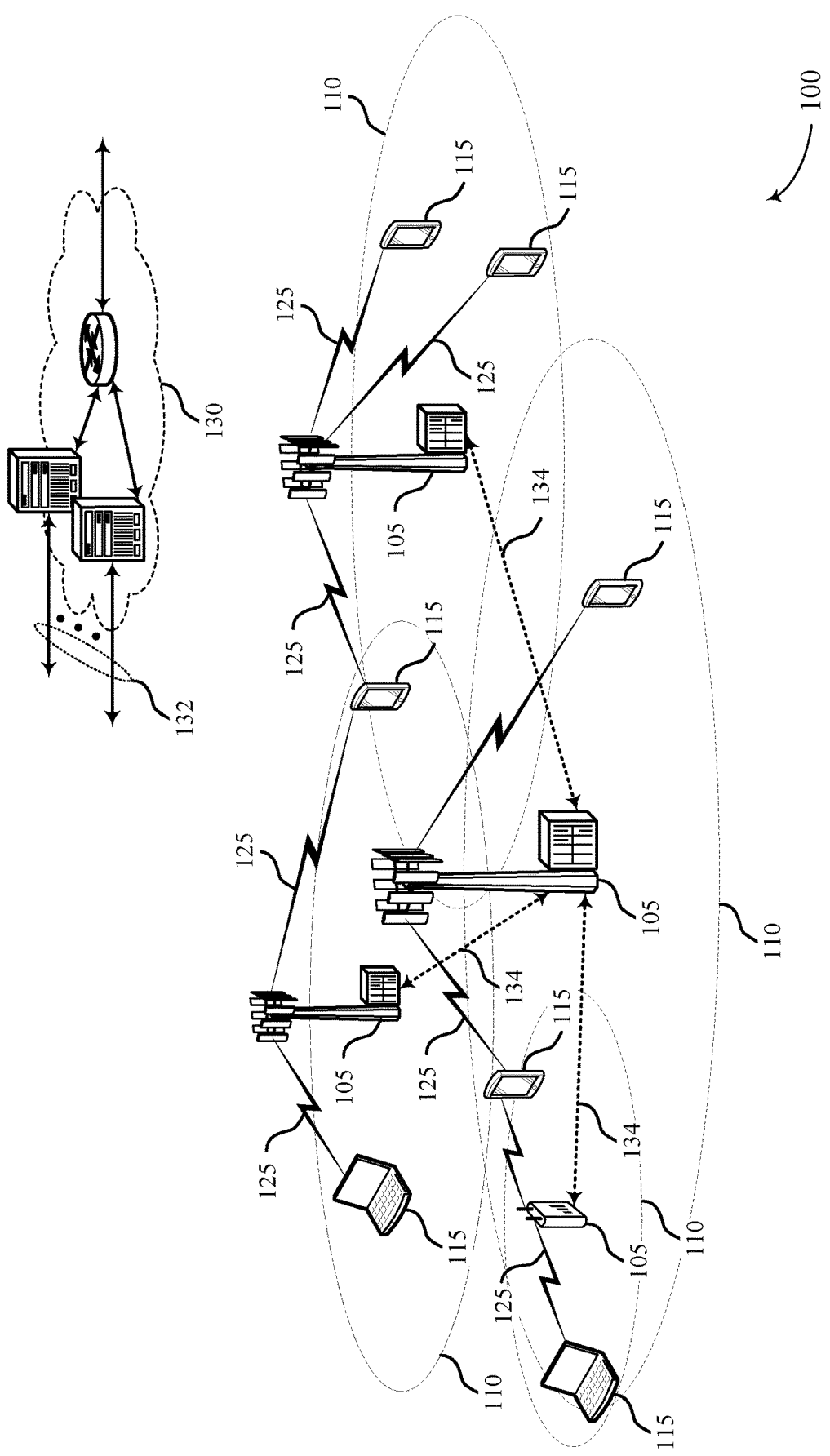
FIG. 1 illustrates an example of a system for wireless communications that supports UE beam detection in accordance with aspects of the present disclosure.

A user equipment (UE) and a base station may support beamformed communications. In some cases, the UE may wake up in a cell provided by the base station and search for synchronization signals to connect to the base station. The base station may periodically transmit synchronization signals in a synchronization signal block (SSB), which may be periodically transmitted in synchronization signal burst sets (SSBS). Each SSB may be associated with, or mapped to, a transmit beam. In some cases, the UE may perform a search procedure to detect new cells, such as the cell provided by the base station. A search procedure may measure, for example, reference signals in a primary synchronization signal (PSS), a secondary synchronization signal (SSS), and a physical broadcast channel (PBCH) of the SSB. The UE may also support performing measurement procedures to track signal strength on existing cells. A measurement procedure may measure reference signals in an SSS of the SSB. The UE may store measurements made during measurement procedures and search procedures in a measurement database at the UE.

Once the UE detects a cell, the UE may also detect new beams for the cell. For example, the UE may detect a transmit beam of the base station by performing a search procedure and detecting an SSB transmitted on the transmit beam. The UE may also detect new receive beams. In some wireless communications systems, a UE may perform a search procedure to detect UE beams. However, the UE may perform a search procedure with a certain periodicity, such as every fourth SSBS. Therefore, UEs of these systems may have several SSBS between search procedure occasions, where the UEs of these systems can only measure already detected receive beams. Until the next occasion for a search procedure, these UEs may either continue to measure the already detected receive beam, or the UE can go to sleep, which may be a waste of time and resources for the UE.

To expedite UE beam detection, a UE described herein may support performing measurement procedures to detect UE beams. Once the UE performs a search procedure and detects a transmit beam of the base station, the UE may trigger UE beam detection. For example, the UE may use all other receive beams to perform a measurement procedure on the transmit beam at subsequent (e.g., back-to-back) SSBS. This may accelerate the rate of populating the measurement database. By populating the measurement database at a faster rate, the UE may be enabled to trigger beam refinement sooner than conventional techniques. For example, the UE may perform the measurement procedures using pseudo-omnidirectional receive beams. Once each pseudo-omnidirectional receive beam has been measured, the UE may perform a beam refinement procedure to select a higher quality narrow beam, which may lead to performance improvement.

Aspects of the disclosure are initially described in the context of a wireless communications system. Aspects of the disclosure are further illustrated by and described with reference to apparatus diagrams, system diagrams, and flowcharts that relate to UE beam detection.

FIG. 1 illustrates an example of a wireless communications system 100 that supports UE beam detection in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be configured to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 described herein may support using measurement procedures for UE beam detection. The UE 115 may use a first receive beam to perform a search procedure for an SSB from a base station 105. The UE 115 may detect an SSB corresponding to a transmit beam of the base station 105, which may trigger UE beam detection. The UE 115 may use each other receive beam to perform measurement procedures in a beam sweep based on detecting the gNB beam (e.g., the transmit beam). To perform the measurement procedures, the UE 115 may use timing information for the SSB and transmit beam determined from the search procedure. The UE 115 may perform measurement procedures on the transmit beam for subsequent SSBS and detect other receive beams. The UE 115 may measure different receive beams in following or subsequent (e.g., back-to-back) SSBS. The UE 115 may then quickly populate a measurement database with measurements for the receive beams. This may enable the UE 115 to trigger beam refinement sooner and select a narrowband beam, which may improve communications performance. In an example, the UE 115 may populate the measurement database with RSRP on each configured pseudo-omnidirectional beam and find the best pseudo-omnidirectional beam for further UE beam refinement.

Figure 2:
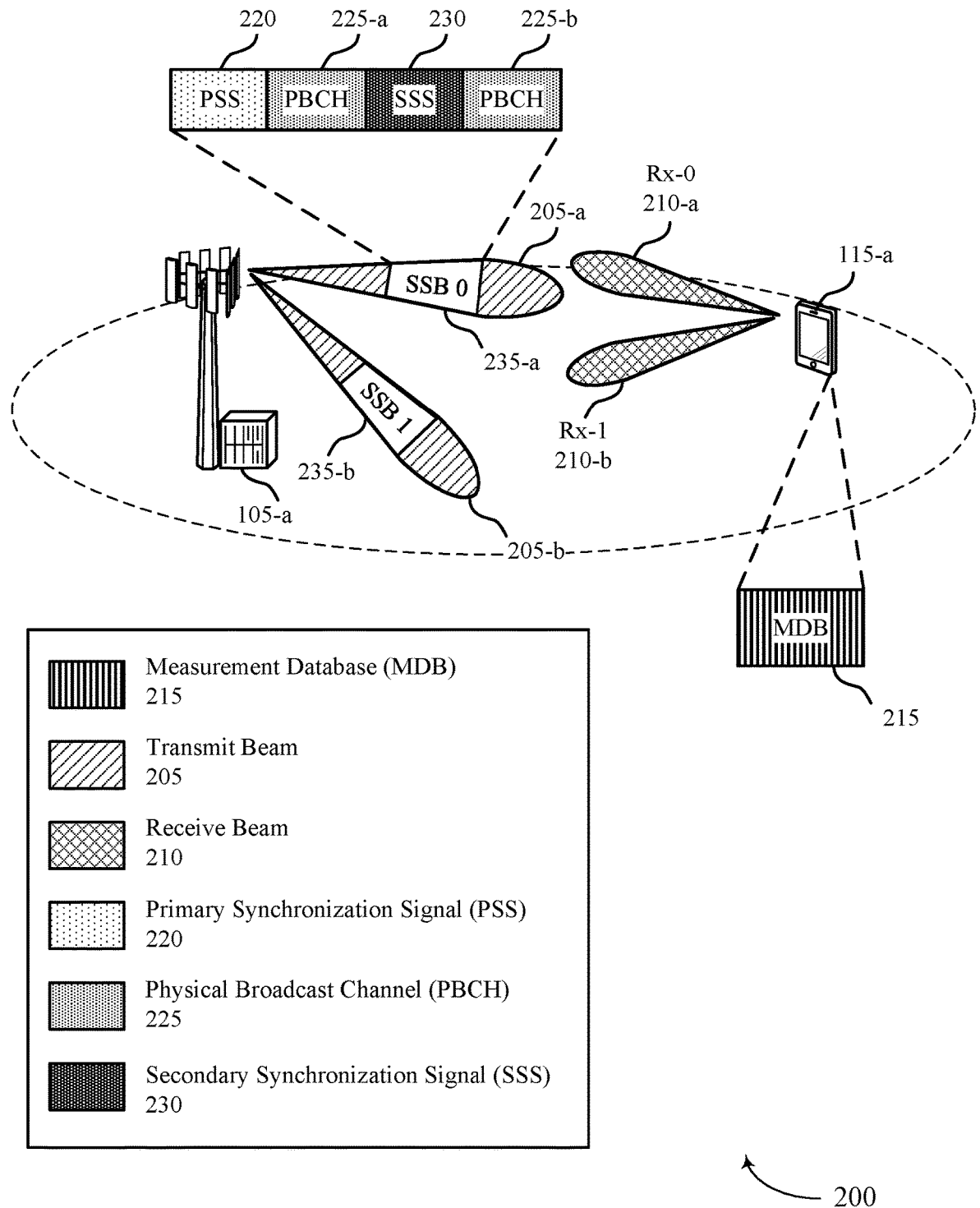
FIG. 2 illustrates an example of a wireless communications system that supports UE beam detection in accordance with aspects of the present disclosure.

FIG. 2 illustrates an example of a wireless communications system 200 that supports UE beam detection in accordance with aspects of the present disclosure. In some examples, the wireless communications system 200 may implement aspects of wireless communication system 100. The wireless communications system 200 may include UE 115-*a* and base station 105-*a*, which may be respective examples of a UE 115 and a base station 105.

In some cases, UE 115-*a* and base station 105-*a* may support beamformed communications. For example, for downlink communications, base station 105-*a* may transmit to UE 115-*a* on a transmit beam 205. UE 115-*a* may monitor for downlink transmissions using a receive beam 210.

In some cases, UE 115-*a* may wake up in a cell provided by base station 105-*a* and search for synchronization signals to connect to base station 105-*a*. Base station 105-*a* may periodically transmit synchronization signals, which UE 115-*a* may use to connect to the cell provided by base station 105-*a*. The synchronization signals may be transmitted in an SSB 235. In some cases, an SSB 235 may include a PSS 220, two PBCHs 225 (e.g., PBCH 225-*a* and PBCH 225-*b*) and an SSS 230.

Each SSB 235 may be associated with a transmit beam 205. For example, SSB 235-*a* may be associated with transmit beam 205-*a*, and SSB 235-*b* may be associated with transmit beam 205-*b*. Each SSB of the SSBS may have an SSB index. For example, SSB 235-*a* may be referred to as "SSB 0," and SSB 235-*b* may be referred to as "SSB 1." SSB 0 may be mapped to transmit beam 205-*a*, and SSB 1 may be mapped to transmit beam 205-*b*. If UE 115-*a* receives an SSB 235 with index 1, UE 115-*a* may determine the association between the received SSB 235 and the transmit beam 205 used by base station 105-*a*.

Base station 105-*a* may transmit bursts of SSBs 235 using a set of transmit beams 205. A synchronization signal burst may include one or more SSBs 235. In some cases, the SSBs 235 of a synchronization signal burst may correspond to different beams. In some examples, one or more synchronization signal bursts may be transmitted together as a synchronization signal burst set (SSBS). An SSBS may be transmitted with a certain periodicity. For example, base station 105-*a* may transmit an SSBS every 20 ms. In some examples, each SSB transmitted in an SSBS may correspond to a different beam. Therefore, each SSB may have a periodicity corresponding to the SSBS periodicity. For example, every 20 ms, base station 105-*a* may transmit an SSB 235 on transmit beam 205-*a*.

In some cases, UE 115-*a* may perform a search procedure to detect new cells. UE 115-*a* may measure reference signals in the PSS 220, the PBCH 225, and the SSS 230 for the search procedure to receive accurate timing and synchronization information for the cell. UE 115-*a* may select a receive beam 210 to receive the SSB 235 and perform the search procedure. In some cases, UE 115-*a* may perform a measurement procedure to track signal strength on existing cells. The measurement procedure may measure the SSS 230 of the SSB 235.

In the wireless communications system 200, once UE 115-*a* detects a cell, UE 115-*a* may still detect new beams for that detected cell. For example, UE 115-*a* may detect a new transmit beam 205 of base station 105-*a* by performing a search procedure and measuring the PSS 220, PBCH 225, and SSS 230 of an SSB 235 transmitted on the transmit beam 205. In some cases, UE 115-*a* may support using a measurement procedure to detect new transmit beams 205 of base station 105-*a*. For example, UE 115-*a* may identify timing information for the cell based on the search procedure. In some examples, UE 115-*a* may use the timing information from the search procedure to perform measurement procedures and detect other transmit beams 205.

UE 115-*a* may detect new receive beams 210 for existing cells. For example, UE 115-*a* may perform a search procedure using a receive beam 210 and for receive beam detection. UE 115-*a* may use receive beam 210-*a* to monitor for an SSB 235 from base station 105-*a*. UE 115-*a* may receive SSB 0, transmitted by base station 105-*a* on transmit beam 205-*a*. UE 115-*a* may measure the signal strength of SSB 0 using other receive beams 210. For example, UE 115-*a* may measure SSB 0 during a later SSBS using receive beam 210-*b*. UE 115-*a* may measure SSB 0 using multiple receive beams 210 and populate a measurement database 215 with the measurements. In some cases, the measurement database 215 may be stored in memory at UE 115-*a*.

UE 115-*a* may take measurements for pseudo-omni receive beams, or pseudo-omnidirectional receive beams, which may cover a wider reception angle than a narrowband beam. For example, there may be multiple different narrowband receive beams which are within the radius of one pseudo-omni receive beam. While pseudo-omni receive beams may cover a wider area, they may not be as strong as narrowband beams.

Once the measurement database 215 is populated for the receive beams 210, UE 115-*a* may perform a beam refinement procedure. In some cases, once each receive beam 210 (e.g., each pseudo-omnidirectional) is measured for a transmit beam 205, UE 115-*a* may trigger the beam refinement procedure. In some cases, the beam refinement procedure may include identifying a narrowband beam to use for communications with the transmit beam. The selected narrowband receive beam may provide a stronger signal strength than the pseudo-omni receive beam, which may lead to improved communications quality. In some cases, UE 115-*a* may determine which receive beam 210 provided the strongest signal strength, and UE 115-*a* may select that receive beam 210, or a narrowband receive beam based on that receive beam 210, to use for the transmit beam 205. In some cases, beam refinement may be triggered once each receive beam 210 of a beam sweep is measured. In some cases, beam refinement may be triggered once a threshold number (e.g., predetermined threshold number) of receive beams 210 are measured.

UE 115-*a* may perform a search procedure with a certain periodicity. For example, UE 115-*a* may perform a search procedure every few SSBS. If base station 105-*a* has an SSBS periodicity of 20 ms, and UE 115-*a* performs a search procedure every 2nd, 4th, or 8th (e.g., or other interval) SSBS, UE 115-*a* may perform a search procedure every 40 ms, 80 ms, or 160 ms. In some cases, some UEs 115 may not support performing a search procedure on back-to-back SSBS. These UEs 115 may support performing measurement procedures to measure already detected beams between search procedure occasions.

In an example, a UE 115 of a conventional wireless communications system may use a receive beam 210 to perform a search procedure and newly detect a transmit beam 205 of a base station 105. The UE 115 may, then, have detected one transmit beam 205 and one receive beam 210 for the detected transmit beam 205. While the UE 115 may be capable of performing measurement procedures on subsequent SSBS, the UE 115 of the conventional wireless communications system may only be supported to measure the already detected receive beam 210. Therefore, until the next occasion for a search procedure, the UE 115 may either continue to measure the already detected receive beam 210, or the UE 115 may go or sleep, which may be a relative waste of time and resources for the UE 115. At the next search procedure occasion, the UE 115 may then perform a search procedure using a different receive beam 210, after which the UE 115 may have two detected receive beams 210.

These conventional techniques may entail a long delay between detecting a first transmit beam 205 of a base station 105 and measuring each receive beam 210 for that transmit beam 205. Especially in high mobility situations, the delay may not be efficient for beam tracking, as the UE 115 may use a pseudo-omnidirectional receive beam until the UE 115 can perform beam refinement and select a higher quality narrowband beam. However, beam refinement may be triggered once the measurement database 215 has measurements for each receive beam 210, which, by using the conventional techniques, takes several search procedure occasions.

UEs 115 described herein, such as UE 115-*a*, may support performing measurement procedures to detect UE beams, such as receive beams 210. Once a transmit beam 205 of base station 105-*a* is detected, UE 115-*a* may trigger receive beam detection. The, UE 115-*a* triggering receive beam detection may accelerate the rate of populating the measurement database 215. By populating the measurement database 215 at a faster rate, UE 115-*a* may trigger beam refinement sooner than conventional techniques. UE 115-*a* triggering beam refinement sooner may enable UE 115-*a* to find a high quality beam (e.g., a high quality narrow beam) relatively quickly for performance improvement.

In some cases, the beam identified may be used for downlink communications or uplink communications. For example, UE 115-*a* may apply beam correspondence when selecting transmit and receive beams. In some cases, UE 115-*a* may use a directionally similar UE transmit beam to a selected UE receive beam.

In an example, UE 115-*a* may use receive beam 210-*a* to perform a search procedure for an SSB 235. UE 115-*a* may detect SSB 235-*a* (e.g., SSB0), transmitted by base station 105-*a* on transmit beam 205-*a*. UE 115-*a* may then use each other receive beam 210 to perform measurement procedures in a beam sweep based on the search procedure. For example, UE 115-*a* may identify timing information for SSB0 and transmit beam 205-*a* based on the search procedure. UE 115-*a* may use the timing information to perform measurement procedures on transmit beam 205-*a* for subsequent SSBS and detect other receive beams 210. For the next SSBS (e.g., 20 ms later), UE 115-*a* may use receive beam 210-*b* to perform a measurement procedure and measure transmit beam 205-*a*. UE 115-*a* may measure different receive beams 210 in following or subsequent (e.g., back-to-back) SSBS. UE 115-*a* may then quickly populate the measurement database 215 with measurements for the receive beams 210. This may enable UE 115-*a* to trigger beam refinement sooner and select a narrowband beam, improving communications performance. For example, UE 115-*a* may populate the measurement database 215 with RSRP on all pseudo-omnidirectional beams and find the best pseudo-omnidirectional beam for further UE beam refinement.

In some cases, these techniques may be applied on a per-SSB basis. For example, for any newly detected SSB, UE 115-*a* may trigger UE beam detection for the newly detected SSB. Even if UE 115-*a* has performed beam refinement for another SSB, UE 115-*b* may perform these enhanced UE beam detection techniques for other SSBs. For example, after performing UE beam detection based on measurement procedures and performing the beam refinement procedure for SSB 0, UE 115-*b* may detect SSB 1. UE 115-*a* may then perform measurement procedures to detect UE beams for SSB 1.

Figure 3:
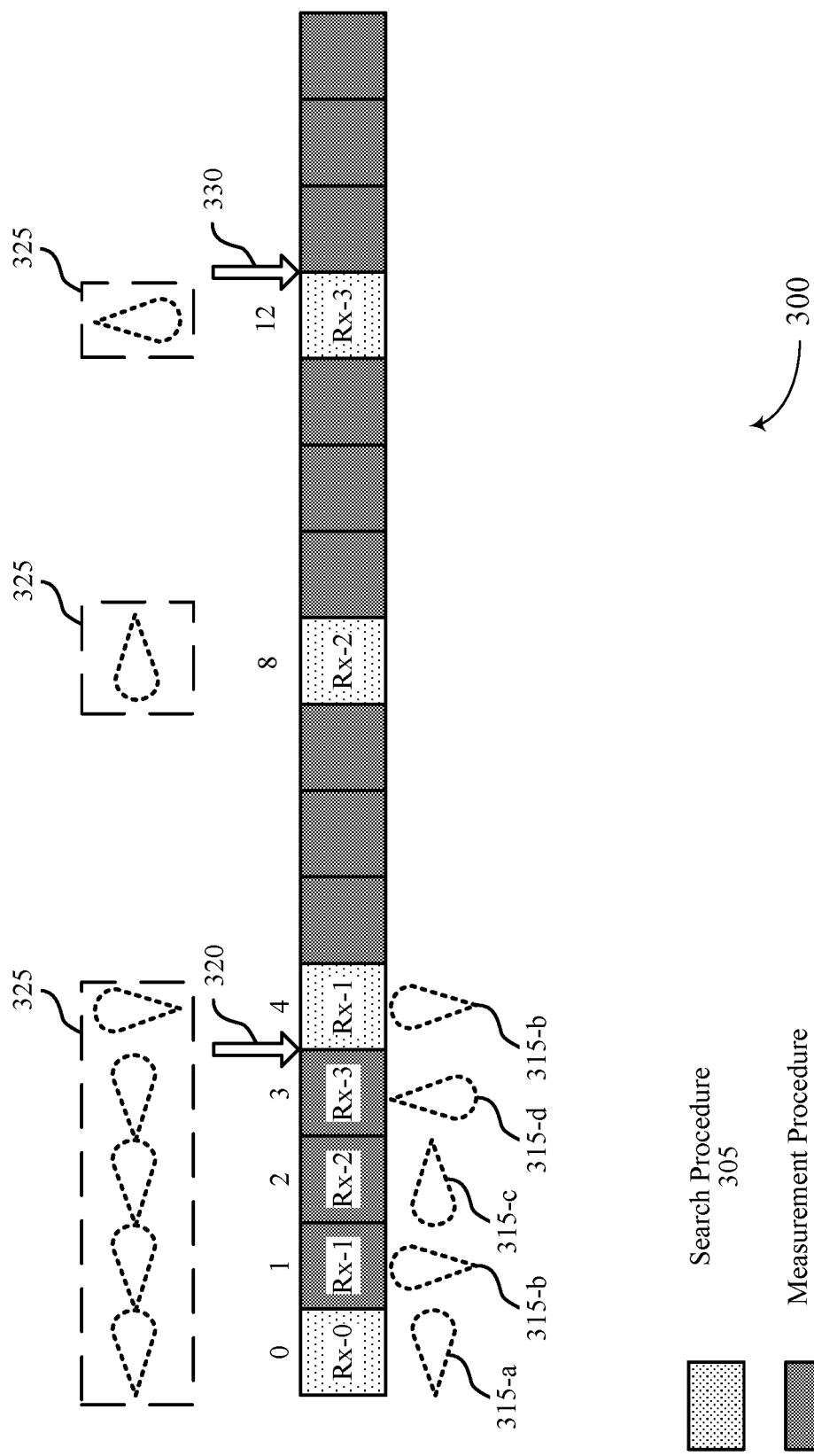
FIG. 3 illustrates an example of a measurement procedure configuration that supports UE beam detection in accordance with aspects of the present disclosure.

FIG. 3 illustrates an example of a measurement procedure configuration 300 that supports UE beam detection in accordance with aspects of the present disclosure. In some examples, the measurement procedure configuration 300 may implement aspects of wireless communication system 100.

A UE 115 may support using measurement procedures to detect UE beams, or receive beams. The UE 115 search for synchronization signal (e.g., SSBs or SS/PBCH blocks) transmitted by a base station 105 (e.g., after waking up in a cell provided by the base station 105). The UE 115 may perform a search procedure 305 using a first receive beam 315-a at a first SSBS (e.g., SSBS 0). The base station 105 may transmit the SSB on a first transmit beam, which may be pointed toward the UE 115. The UE 115 may receive the SSB on the first receive beam 315-a and measure reference signals transmitted in the SSB as part of the search procedure. The UE 115 may then record the measurements of the transmit beam in a measurement database based on the search procedure.

The UE 115 may identify timing information for the SSB and corresponding transmit beam based on the search procedure. Because the UE 115 has performed one search procedure using one receive beam 315, other receive beams 315 for the SSB may not be detected. Therefore, the UE 115 may use timing information determined from the search procedure to perform measurement procedures using other receive beams 315.

After one gNB beam is detected by a search procedure 305 on one receive beam 315 (e.g., on one pseudo-omni receive beam), the UE 115 may trigger UE beam detection. For example, after a new gNB beam, corresponding to the SSB, is detected on one of the receive beams 315, the UE 115 may then use other receive beams 315 to perform beam sweeping based on measurement procedures 310. This may expedite the rate at which the UE 115 populates the measurement database with measurement values, such as RSRP values, for the receive beams 315.

At a following SSBS (e.g., SSBS 1), the UE 115 may perform a measurement procedure 310 using receive beam 315-b to measure the transmit beam. The UE 115 may record the measurements from the measurement procedure 310 using receive beam 315-b in the measurement database. For successive SSBS, the UE 115 may perform measurement procedures 310 using different beams of the beams weep to record measurements for each receive beam 315. For example, at SSBS 2, the UE 115 may perform a measurement procedure of the transmit beam using receive beam 315-c, and at SSBS 3, the UE 115 may perform a measurement procedure of the transmit beam using receive beam 315-d.

After performing a search procedure and detecting an SSB using a first configured receive beam 315, the UE 115 may perform a measurement procedure using the other configured receive beams 315 to measure the transmit beam. For example, the UE 115 may be configured with four pseudo-omnidirectional receive beams 315. The UE 115 may perform a first search procedure to detect a gNB beam using a first pseudo-omnidirectional receive beam 315, then the UE 115 may perform measurement procedures on the transmit beam using each of the other three pseudo-omnidirectional receive beams 315 for the next three SSBS. The UE beam detection phase may then end after four SSBS, such as at 320. After that, the measurement database may have all receive beam information, and the UE 115 may be enabled to trigger beam refinement. For example, the UE 115 may be enabled to refine to a narrower receive beam.

In some cases, receive beam 315-b may be the next receive beam 315 after receive beam 315-a in a beam sweep. While receive beam 315-b is shown to be perpendicular to receive beam 315-a, the receive beams 315 used for back-to-back measurement procedures 310, or a measurement procedure 310 following a search procedure 305, may be of varying degrees. For example, receive beam 315-b may be just a few degrees different from receive beam 315-a, or receive beam 315-b may be several (e.g., 90 degrees or more) degrees different from receive beam 315-a.

In comparison, a conventional UE beam detection technique 325 may perform a search procedure 305 at SSBS 0 using receive beam 315-a. The conventional UE beam detection technique 325 may support using just receive beam 315-a for measurement procedures until the next search procedure occasion, which may be at SSBS 4. At SSBS 4, the conventional UE beam detection technique 325 may support the conventional UE 115 to perform a search procedure using a different receive beam 315 (e.g., receive beam 315-b). In a similar example, where the conventional UE 115 has four pseudo-omnidirectional receive beams 315, the conventional UE 115 may not finish UE beam detection until SSBS 12 at 330, which may be four times as slow as the enhanced UE beam detection techniques applied by a UE 115 described herein.

Figure 4:
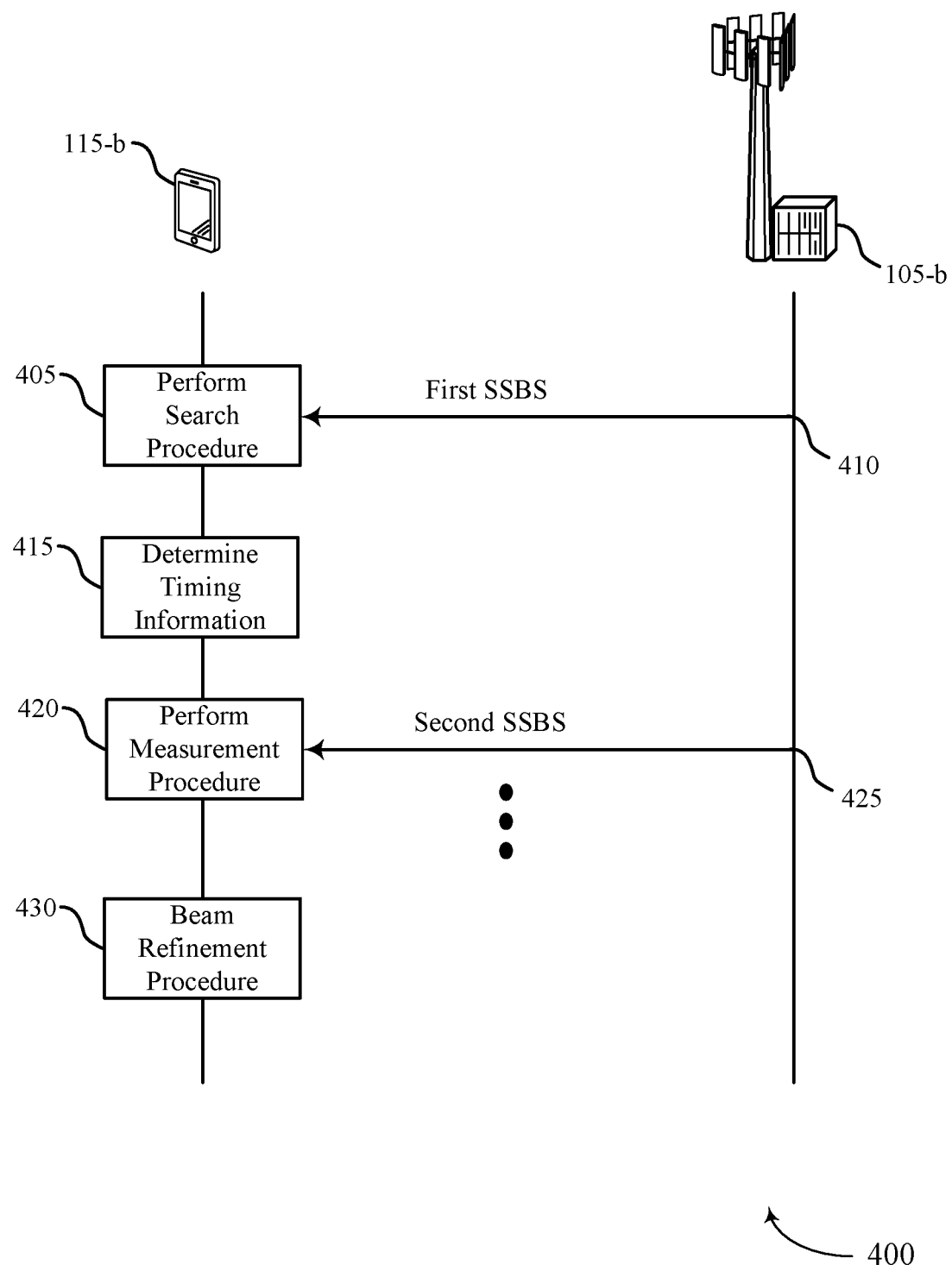
FIG. 4 illustrates an example of a process flow that supports UE beam detection in accordance with aspects of the present disclosure.

FIG. 4 illustrates an example of a process flow 400 that supports UE beam detection in accordance with aspects of the present disclosure. In some examples, the process flow 400 may implement aspects of wireless communication system 100. Process flow 400 may include UE 115-b and base station 105-b, which may be respective examples of a UE 115 and a base station 105 described herein.

In some cases, UE 115-b may wake up in a cell provided by base station 105-b. UE 115-b may look for synchronization signals transmitted by base station 105-b to connect to the cell. At 405, UE 115-b may perform a search procedure using a first receive beam. For example, UE 115-b may monitor for an SSB transmitted by base station 105-b using the first receive beam.

At 410, base station 105-b may transmit the SSB on a transmit beam during a first SSBS. UE 115-b may detect, based on performing the search procedure, the SSB corresponding to the transmit beam in the first SSBS transmitted by base station 105-b. UE 115-b may measuring reference signals in a PSS, a PBCH, and an SSS of the SSB. UE 115-b may enter a measurement value for the first receive beam in a measurement database based on performing the search procedure. In some cases, the SSB may be mapped to the transmit beam. In some cases, detecting the transmit beam may trigger a UE beam measurement procedure.

At 415, UE 115-b may determine timing information for the SSB based on the search procedure. In some cases, determining timing information for the SSB may include, or be associated with, timing information for the transmit beam.

At 420, UE 115-b may perform a measurement procedure on a second SSBS using a second receive beam to measure the transmit beam, wherein the second SSBS is transmitted subsequently to the first SSBS. For example, base station 105-b may have an SSBS periodicity of 20 ms. Therefore, the second SSBS transmitted at 425 may be 20 ms after the first SSBS transmitted at 410. In some cases, UE 115-b may perform the measurement procedure based on the timing information determined at 415. In some examples, the first receive beam and the second receive beam may each be an example of a pseudo-omni receive beam, or a pseudo-omnidirectional receive beam.

In some cases, UE 115-b may perform a measurement procedure for each configured receive beam as part of a beam sweep based on detecting the SSB. For example, UE 115-*b* may perform a measurement procedure on the transmit beam using each configured receive beam. This may expedite the populating of a measurement database so that UE 115-*b* may perform a beam refinement process. UE 115-*b* may enter a measurement value for the second receive beam in the measurement database based on performing the measurement procedure. In some cases, UE 115-*b* may support submitting new entries into the measurement database based on performing measurement procedures, where some conventional UEs 115 may only use measurement procedures to update existing values in the measurement database.

At 430, UE 115-*b* may perform a beam refinement process. In some cases, UE 115-*b* may perform the beam refinement process once each receive beam has a measurement value in the measurement database. In some cases, the beam refinement process may include selecting a narrowband receive beam for the transmit beam based on the measurements taken for the measurement procedures. For example, UE 115-*b* may refine the receive beam from the pseudo-omnidirectional beams used to perform the measurement procedures. UE 115-*b* may then select a narrower beam which may lead to higher quality communications quality.

These techniques may enable UE 115-*a* to perform UE beam detection by using measurement procedures. UE 115-*a* may perform a search procedure at SSBS N to detect a gNB beam. UE 115-*a* may then perform measurement procedures on the gNB beam beginning at SSBS N+1 to determine RSRP for different UE receive beams. Once UE 115-*a* has a measurement for each configured UE receive beam, UE 115-*a* may be configured to perform a beam refinement procedure.

Figure 5:
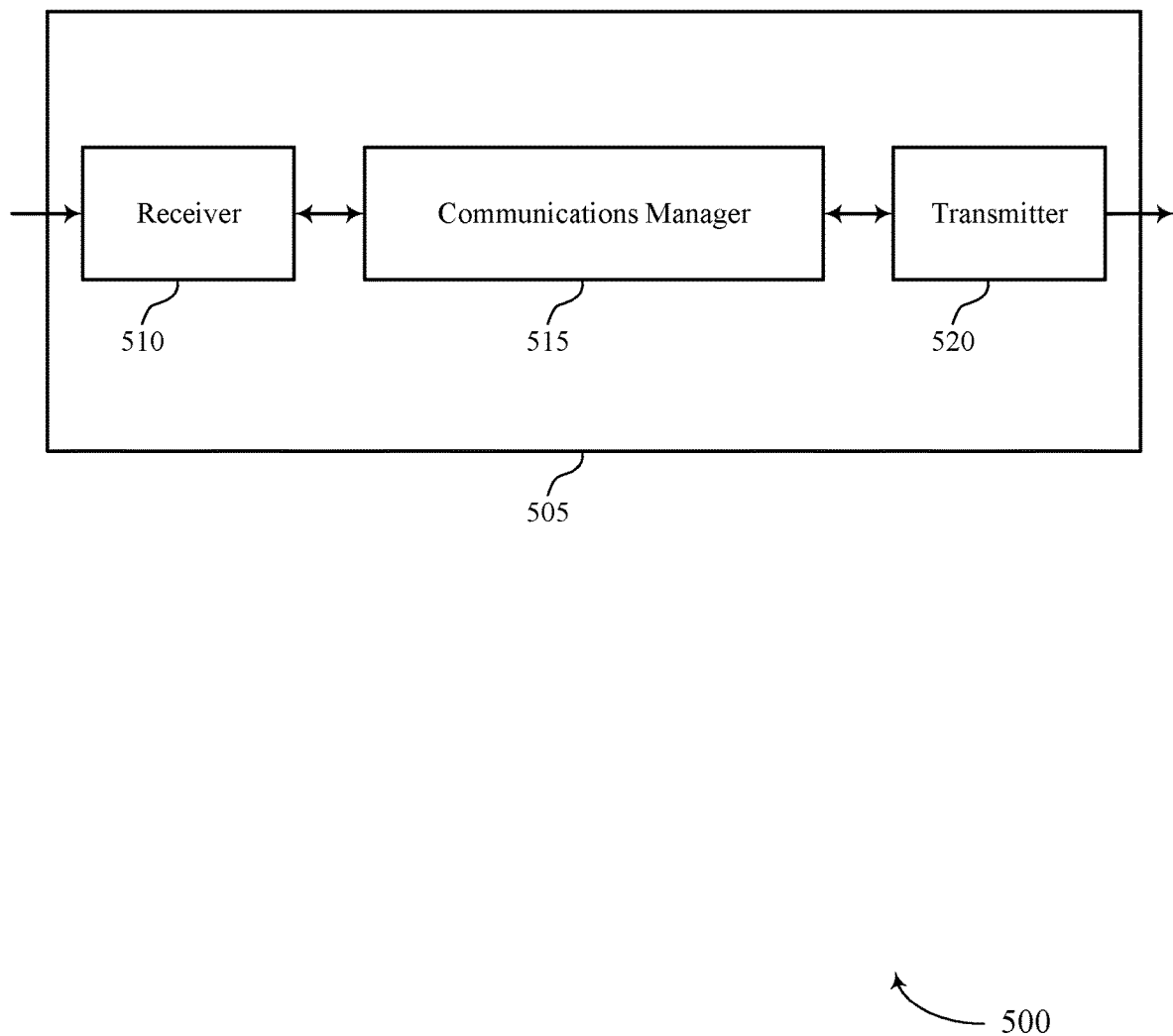
FIGS. 5 and 6 show block diagrams of devices that support UE beam detection in accordance with aspects of the present disclosure.

FIG. 5 shows a block diagram 500 of a device 505 that supports UE beam detection in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform the UE beam detection features discussed herein. Each of these components may be in communication with one another (e.g., via one or more buses).

The receiver 510 may receive information such as packets, user data, or control information associated with various information channels (e.g., control channels, data channels, and information related to UE beam detection, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may perform a search procedure using a first receive beam, detect, based on performing the search procedure, a synchronization signal block corresponding to a transmit beam in a first synchronization signal burst set transmitted by a base station, and perform a measurement procedure on a second synchronization signal burst set using a second receive beam to measure the transmit beam, where the second synchronization signal burst set is transmitted subsequently to the first synchronization signal burst set. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
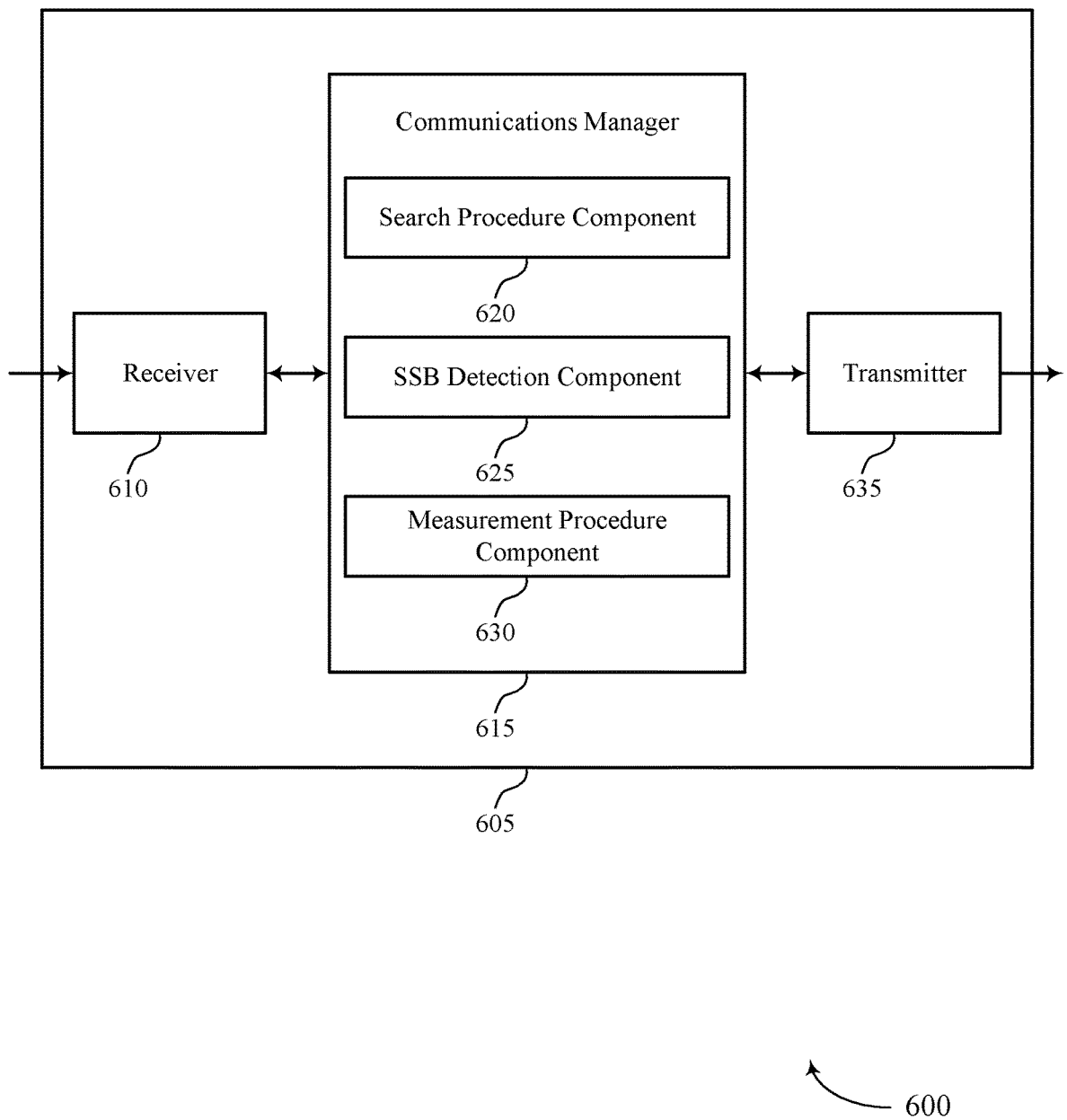

FIG. 6 shows a block diagram 600 of a device 605 that supports UE beam detection in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to UE beam detection, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a search procedure component 620, a SSB detection component 625, and a measurement procedure component 630. The communications manager 615 may be an example of aspects of the communications manager 810 described herein.

The search procedure component 620 may perform a search procedure using a first receive beam. The SSB detection component 625 may detect, based on performing the search procedure, a synchronization signal block corresponding to a transmit beam in a first synchronization signal burst set transmitted by a base station. The measurement procedure component 630 may perform a measurement procedure on a second synchronization signal burst set using a second receive beam to measure the transmit beam, where the second synchronization signal burst set is transmitted subsequently to the first synchronization signal burst set.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some cases, the search procedure component 620, or SSB detection component 625, or measurement procedure component 630, or any combination thereof, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the search procedure component 620, or SSB detection component 625, or measurement procedure component 630, or any combination thereof discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
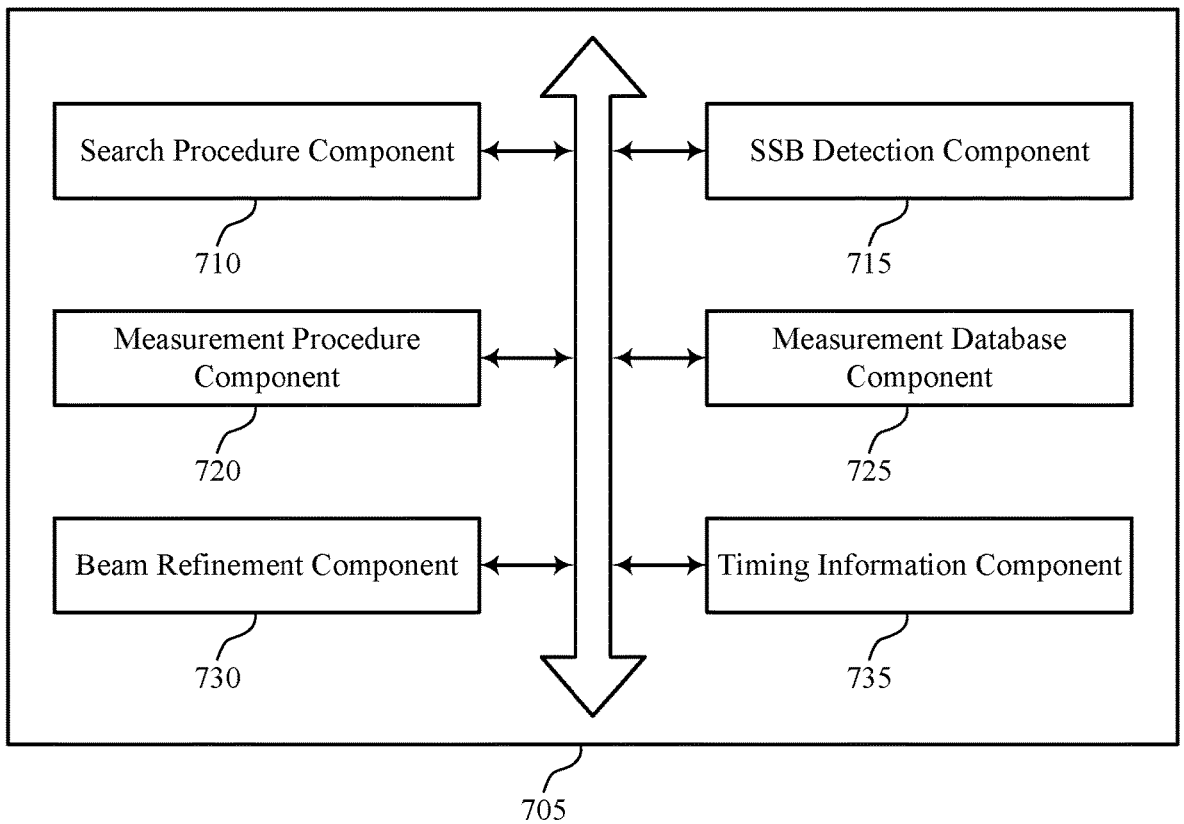
FIG. 7 shows a block diagram of a communications manager that supports UE beam detection in accordance with aspects of the present disclosure.

FIG. 7 shows a block diagram 700 of a communications manager 705 that supports UE beam detection in accordance with aspects of the present disclosure. The communications manager 705 may be an example of aspects of a communications manager 515, a communications manager 615, or a communications manager 810 described herein. The communications manager 705 may include a search procedure component 710, a SSB detection component 715, a measurement procedure component 720, a measurement database component 725, a beam refinement component 730, and a timing information component 735. Each of these modules may communicate, directly or indirectly, with one another (e.g., via one or more buses).

The search procedure component 710 may perform a search procedure using a first receive beam. In some examples, the search procedure component 710 may receive the synchronization signal block using the first receive beam, where detecting the synchronization signal block is based on the receiving.

In some examples, the search procedure component 710 may measure reference signals in a PSS, a PBCH, and a SSS of the synchronization signal block. In some cases, the search procedure is performed during a first search occasion, and the measurement procedure is performed prior to a second search occasion subsequent to the first search occasion.

The SSB detection component 715 may detect, based on performing the search procedure, a synchronization signal block corresponding to a transmit beam in a first synchronization signal burst set transmitted by a base station.

The measurement procedure component 720 may perform a measurement procedure on a second synchronization signal burst set using a second receive beam to measure the transmit beam, where the second synchronization signal burst set is transmitted subsequently to the first synchronization signal burst set. In some examples, the measurement procedure component 720 may measure reference signals in a SSS in the second synchronization signal burst set.

In some examples, the measurement procedure component 720 may perform a set of measurement procedures for each configured receive beam as part of a beam sweep based on detecting the synchronization signal block. In some examples, performing a set of measurement procedures on a set of synchronization signal burst sets using a set of receive beams to measure the transmit beam, where the set of receive beams includes the second receive beam, the set of synchronization signal burst sets includes the second synchronization signal burst set, and the set of synchronization signal burst sets is transmitted subsequent to the first synchronization signal burst set.

In some examples, the measurement procedure component 720 may detect the transmit beam of the base station based on performing the search procedure. In some examples, the measurement procedure component 720 may trigger the measurement procedure based on the detecting. In some cases, the first receive beam and the second receive beam are each a pseudo-omni receive beam.

The measurement database component 725 may enter a measurement value for the second receive beam in a measurement database based on performing the measurement procedure. In some examples, the measurement database component 725 may determine there is no entry associated with the transmit beam for the second receive beam in a measurement database, where the measurement procedure is performed based on the determining. In some cases, the measurement value includes an RSRP associated with the second receive beam and the transmit beam.

The beam refinement component 730 may trigger a beam refinement procedure based on the set of measurement procedures. In some examples, the beam refinement component 730 may select a narrowband receive beam for the transmit beam based on a set of measurements taken for the corresponding set of measurement procedures.

The timing information component 735 may determine timing information for the synchronization signal block based on the search procedure, where performing the measurement procedure is based on the timing information.

In some cases, the search procedure component 710, or the SSB detection component 715, or the measurement procedure component 720, or the measurement database component 725, or the beam refinement component 730, or the timing information component 735, or any combination thereof may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the search procedure component 710, or the SSB detection component 715, or the measurement procedure component 720, or the measurement database component 725, or the beam refinement component 730, or the timing information component 735, or any combination thereof.

Figure 8:
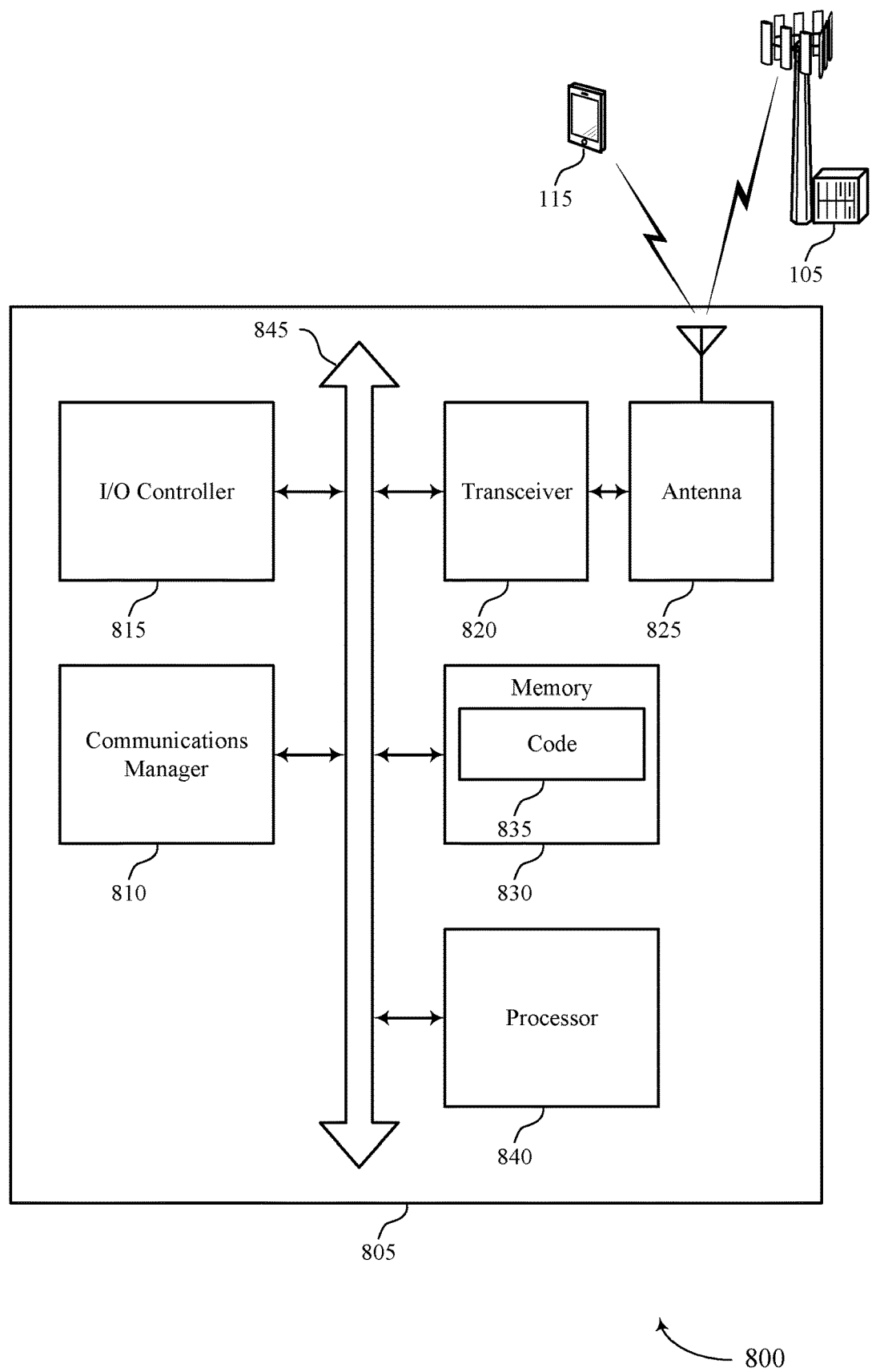
FIG. 8 shows a diagram of a system including a device that supports UE beam detection in accordance with aspects of the present disclosure.

FIG. 8 shows a diagram of a system 800 including a device 805 that supports UE beam detection in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may perform a search procedure using a first receive beam, detect, based on performing the search procedure, a synchronization signal block corresponding to a transmit beam in a first synchronization signal burst set transmitted by a base station, and perform a measurement procedure on a second synchronization signal burst set using a second receive beam to measure the transmit beam, where the second synchronization signal burst set is transmitted subsequently to the first synchronization signal burst set.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting UE beam detection).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
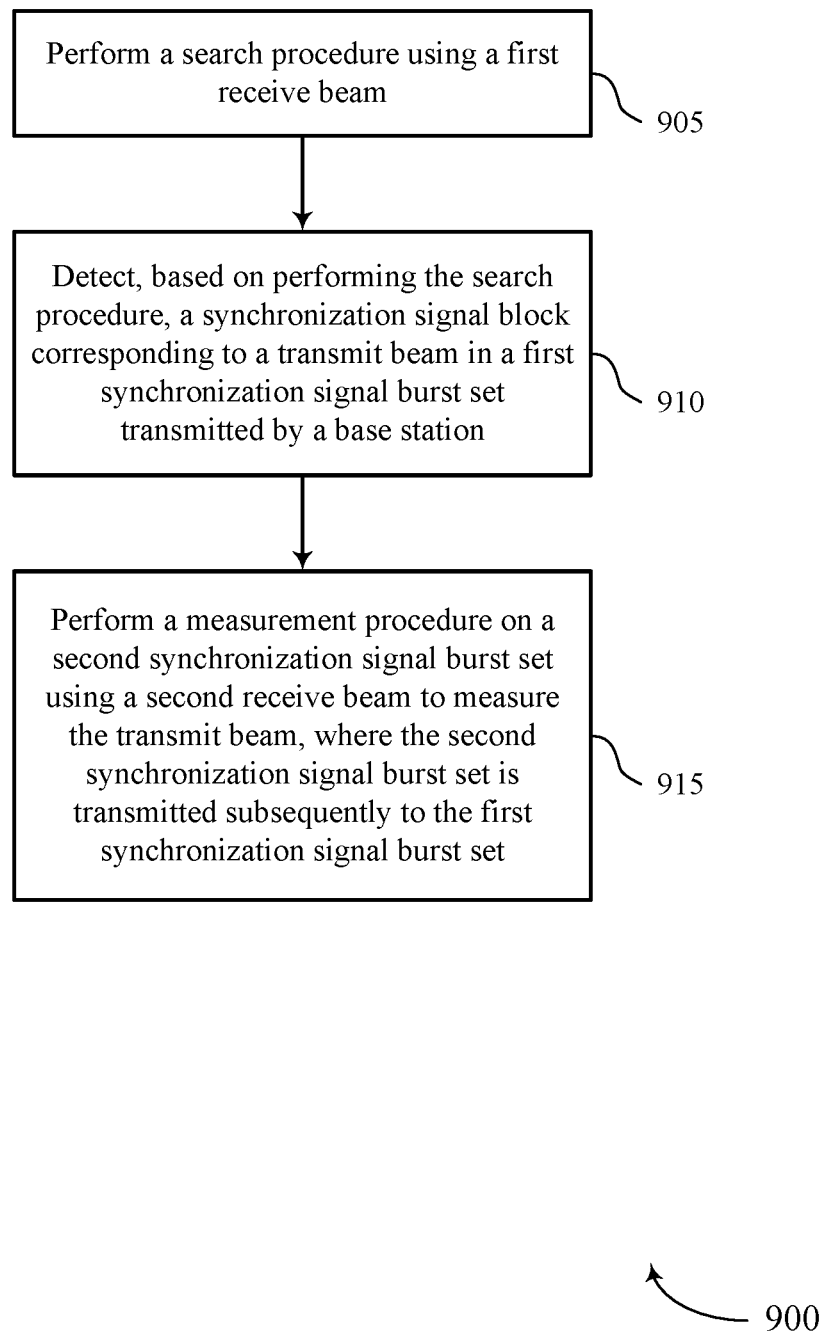
FIGS. 9 through 12 show flowcharts illustrating methods that support UE beam detection in accordance with aspects of the present disclosure.

FIG. 9 shows a flowchart illustrating a method 900 that supports UE beam detection in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may perform a search procedure using a first receive beam. The operations of 905 may be performed according to the methods described herein. In some examples, aspects of the operations of 905 may be performed by a search procedure component as described with reference to FIGS. 5 through 8.

At 910, the UE may detect, based on performing the search procedure, a synchronization signal block corresponding to a transmit beam in a first synchronization signal burst set transmitted by a base station. The operations of 910 may be performed according to the methods described herein. In some examples, aspects of the operations of 910 may be performed by a SSB detection component as described with reference to FIGS. 5 through 8.

At 915, the UE may perform a measurement procedure on a second synchronization signal burst set using a second receive beam to measure the transmit beam, where the second synchronization signal burst set is transmitted subsequently to the first synchronization signal burst set. The operations of 915 may be performed according to the methods described herein. In some examples, aspects of the operations of 915 may be performed by a measurement procedure component as described with reference to FIGS. 5 through 8.

Figure 10:
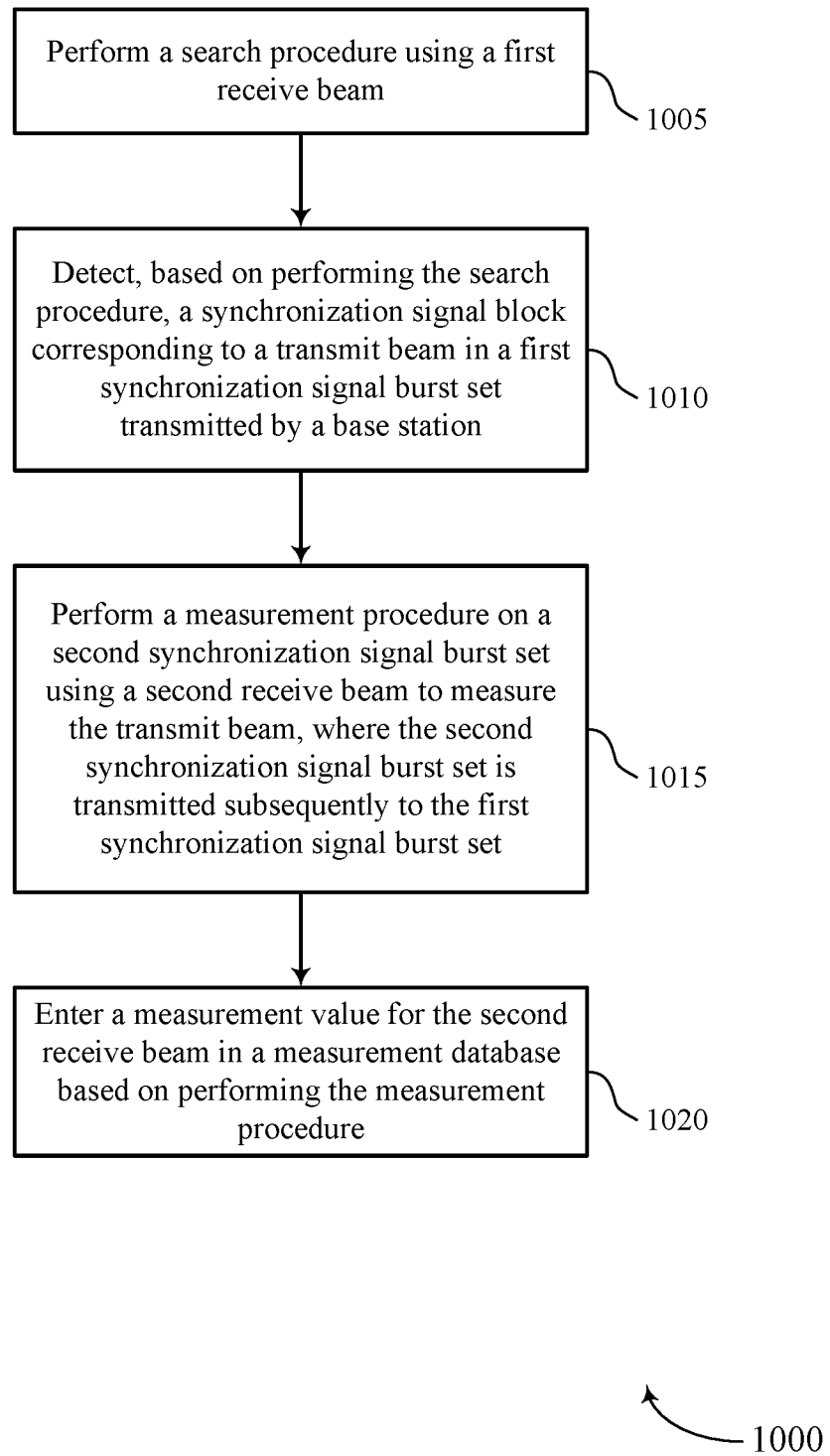

FIG. 10 shows a flowchart illustrating a method 1000 that supports UE beam detection in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may perform a search procedure using a first receive beam. The operations of 1005 may be performed according to the methods described herein. In some examples, aspects of the operations of 1005 may be performed by a search procedure component as described with reference to FIGS. 5 through 8.

At 1010, the UE may detect, based on performing the search procedure, a synchronization signal block corresponding to a transmit beam in a first synchronization signal burst set transmitted by a base station. The operations of 1010 may be performed according to the methods described herein. In some examples, aspects of the operations of 1010 may be performed by a SSB detection component as described with reference to FIGS. 5 through 8.

At 1015, the UE may perform a measurement procedure on a second synchronization signal burst set using a second receive beam to measure the transmit beam, where the second synchronization signal burst set is transmitted subsequently to the first synchronization signal burst set. The operations of 1015 may be performed according to the methods described herein. In some examples, aspects of the operations of 1015 may be performed by a measurement procedure component as described with reference to FIGS. 5 through 8.

At 1020, the UE may enter a measurement value for the second receive beam in a measurement database based on performing the measurement procedure. The operations of 1020 may be performed according to the methods described herein. In some examples, aspects of the operations of 1020 may be performed by a measurement database component as described with reference to FIGS. 5 through 8.

Figure 11:
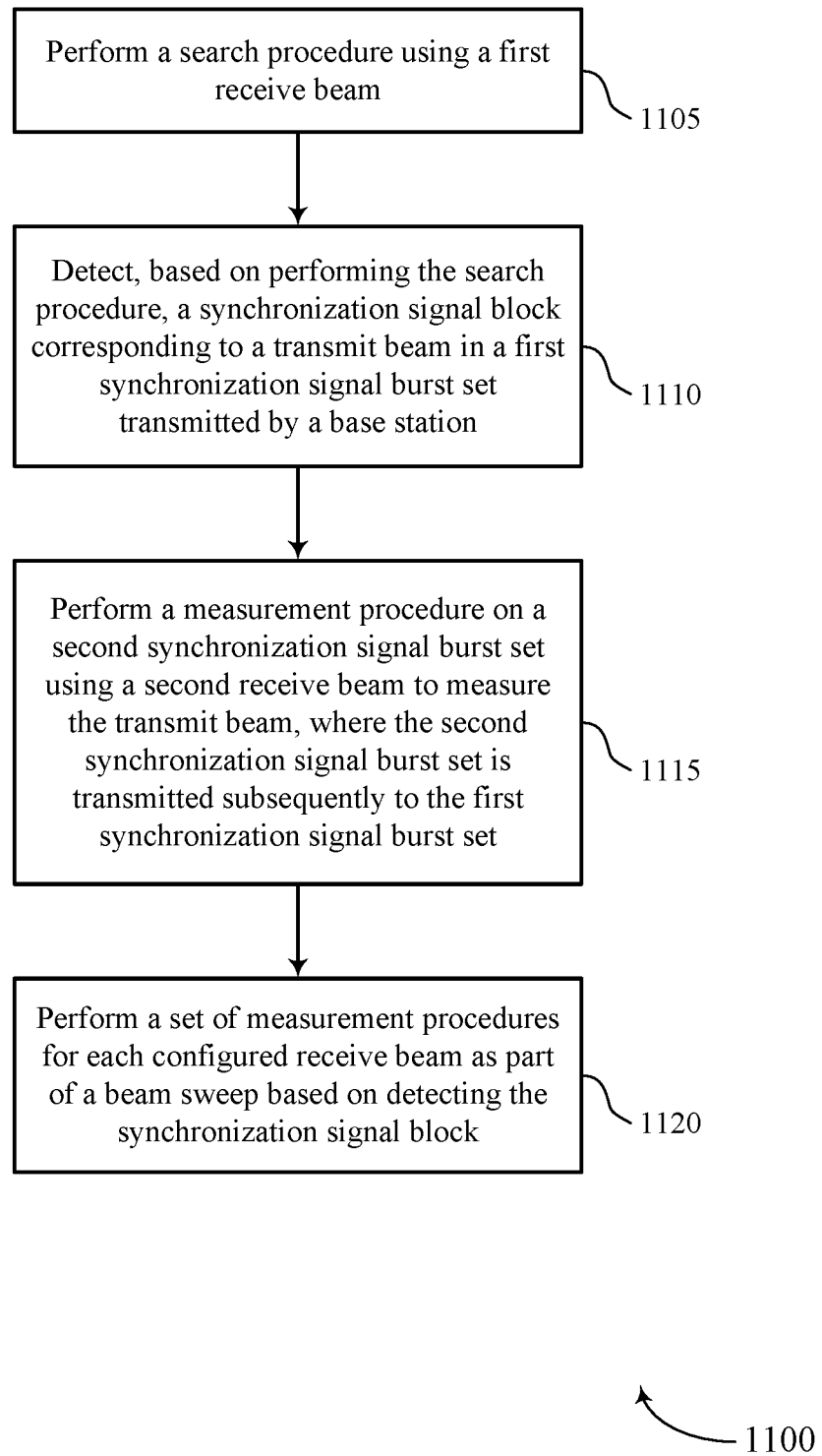

FIG. 11 shows a flowchart illustrating a method 1100 that supports UE beam detection in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may perform a search procedure using a first receive beam. The operations of 1105 may be performed according to the methods described herein. In some examples, aspects of the operations of 1105 may be performed by a search procedure component as described with reference to FIGS. 5 through 8.

At 1110, the UE may detect, based on performing the search procedure, a synchronization signal block corresponding to a transmit beam in a first synchronization signal burst set transmitted by a base station. The operations of 1110 may be performed according to the methods described herein. In some examples, aspects of the operations of 1110 may be performed by a SSB detection component as described with reference to FIGS. 5 through 8.

At 1115, the UE may perform a measurement procedure on a second synchronization signal burst set using a second receive beam to measure the transmit beam, where the second synchronization signal burst set is transmitted subsequently to the first synchronization signal burst set. The operations of 1115 may be performed according to the methods described herein. In some examples, aspects of the operations of 1115 may be performed by a measurement procedure component as described with reference to FIGS. 5 through 8.

At 1120, the UE may perform a set of measurement procedures for each configured receive beam as part of a beam sweep based on detecting the synchronization signal block. The operations of 1120 may be performed according to the methods described herein. In some examples, aspects of the operations of 1120 may be performed by a measurement procedure component as described with reference to FIGS. 5 through 8.

Figure 12:
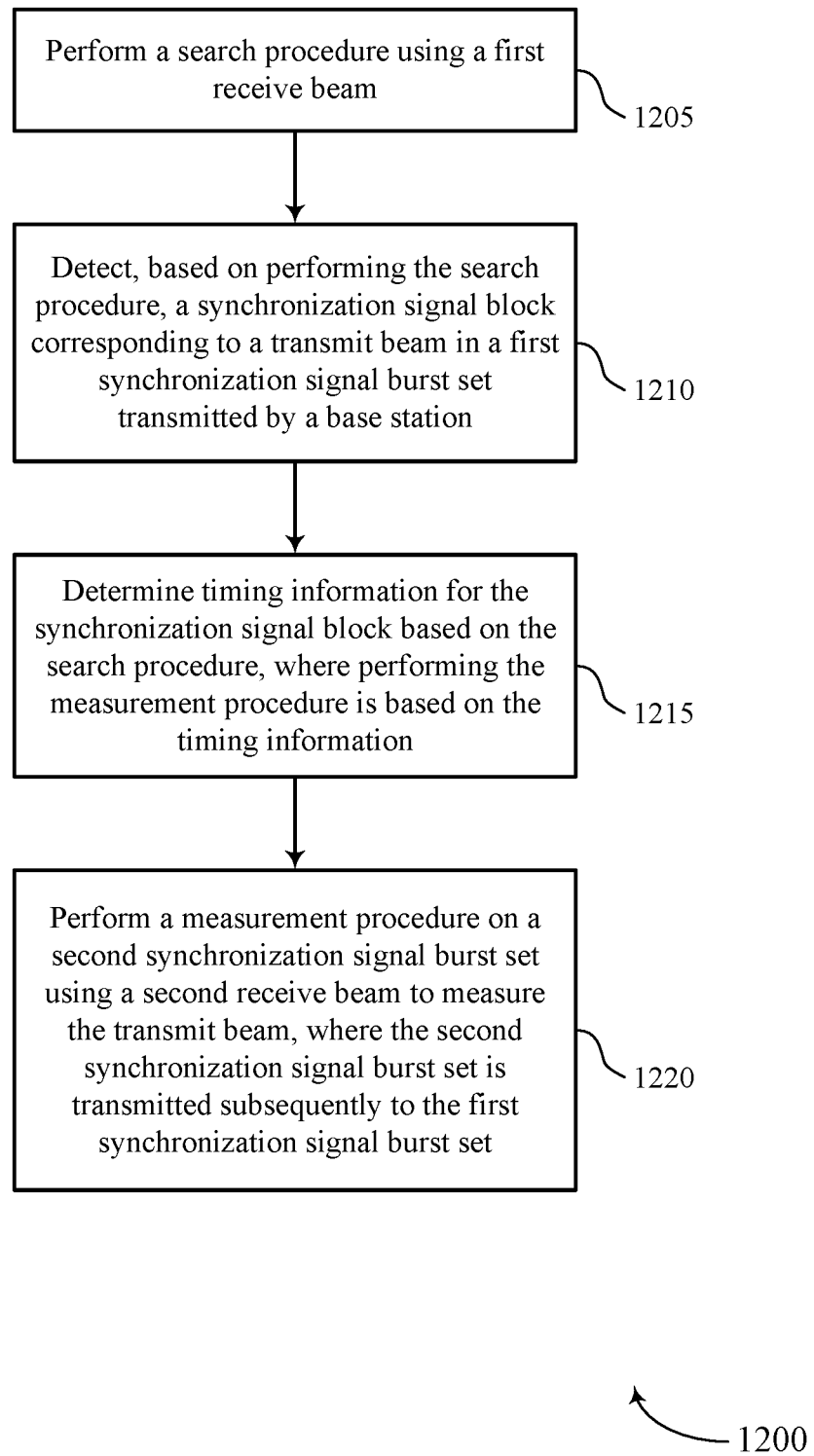

FIG. 12 shows a flowchart illustrating a method 1200 that supports UE beam detection in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may perform a search procedure using a first receive beam. The operations of 1205 may be performed according to the methods described herein. In some examples, aspects of the operations of 1205 may be performed by a search procedure component as described with reference to FIGS. 5 through 8.

At 1210, the UE may detect, based on performing the search procedure, a synchronization signal block corresponding to a transmit beam in a first synchronization signal burst set transmitted by a base station. The operations of 1210 may be performed according to the methods described herein. In some examples, aspects of the operations of 1210 may be performed by a SSB detection component as described with reference to FIGS. 5 through 8.

At 1215, the UE may determine timing information for the synchronization signal block based on the search procedure, where performing the measurement procedure is based on the timing information. The operations of 1215 may be performed according to the methods described herein. In some examples, aspects of the operations of 1215 may be performed by a timing information component as described with reference to FIGS. 5 through 8.

At 1220, the UE may perform a measurement procedure on a second synchronization signal burst set using a second receive beam to measure the transmit beam, where the second synchronization signal burst set is transmitted subsequently to the first synchronization signal burst set. The operations of 1220 may be performed according to the methods described herein. In some examples, aspects of the operations of 1220 may be performed by a measurement procedure component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   performing a search procedure using a first receive beam;
   detecting, based at least in part on performing the search procedure, a synchronization signal block corresponding to a transmit beam in a first synchronization signal burst set transmitted by a base station; and
   performing, to measure the transmit beam that was detected in the first synchronization signal burst set, a measurement procedure on a second synchronization signal burst set using a plurality of receive beams to select a second receive beam from the plurality of receive beams;
   wherein the search procedure is performed during a first search occasion and the measurement procedure is performed prior to a second search occasion subsequent to the first search occasion, and wherein the second synchronization signal burst set is transmitted subsequently to the first synchronization signal burst set.

2. The method of claim 1, wherein performing the search procedure comprises:
   receiving the synchronization signal block using the first receive beam, wherein detecting the synchronization signal block is based at least in part on receiving the synchronization signal block using the first receive beam; and
   measuring reference signals in a primary synchronization signal (PSS), a physical broadcast channel (PBCH), and a secondary synchronization signal (SSS) of the synchronization signal block.

3. The method of claim 1, wherein performing the measurement procedure comprises:
   measuring reference signals in a secondary synchronization signal (SSS) in the second synchronization signal burst set.

4. The method of claim 1, further comprising:
   entering a measurement value for the second receive beam in a measurement database based at least in part on performing the measurement procedure.

5. The method of claim 4, wherein the measurement value comprises a reference signal received power (RSRP) associated with the second receive beam and the transmit beam.

6. The method of claim 1, further comprising:
   performing a plurality of measurement procedures for each configured receive beam as part of a beam sweep based at least in part on detecting the synchronization signal block.

7. The method of claim 1, further comprising:
   performing a plurality of measurement procedures on a plurality of synchronization signal burst sets using a plurality of receive beams to measure the transmit beam, wherein the plurality of receive beams comprises the second receive beam, the plurality of synchronization signal burst sets comprises the second synchronization signal burst set, and the plurality of synchronization signal burst sets is transmitted subsequent to the first synchronization signal burst set.

8. The method of claim 7, further comprising:
   triggering a beam refinement procedure based at least in part on the plurality of measurement procedures.

9. The method of claim 7, further comprising:
   selecting a narrowband receive beam for the transmit beam based at least in part on a plurality of measurements taken for the plurality of measurement procedures.

10. The method of claim 1, further comprising:
    determining timing information for the synchronization signal block based at least in part on the search procedure, wherein performing the measurement procedure is based at least in part on the timing information.

11. The method of claim 1, wherein the first receive beam and the second receive beam are each a pseudo-omni receive beam.

12. The method of claim 1, further comprising:
    detecting the transmit beam of the base station based at least in part on performing the search procedure; and
    triggering the measurement procedure based at least in part on the detecting.

13. The method of claim 1, further comprising:
    determining there is no entry associated with the transmit beam for the second receive beam in a measurement database, wherein the measurement procedure is performed based at least in part on the determining.

14. An apparatus for wireless communication at a user equipment (UE), comprising:
    a processor,
    memory coupled with the processor; and
    instructions stored in the memory and executable by the processor to cause the apparatus to:
    perform a search procedure using a first receive beam;
    detect, based at least in part on performing the search procedure, a synchronization signal block corresponding to a transmit beam in a first synchronization signal burst set transmitted by a base station; and
    perform, to measure the transmit beam that was detected in the first synchronization signal burst set, a measurement procedure on a second synchronization signal burst set using a plurality of receive beams to select a second receive beam from the plurality of receive beams;
    wherein the search procedure is performed during a first search occasion and the measurement procedure is performed prior to a second search occasion subsequent to the first search occasion, and wherein the second synchronization signal burst set is transmitted subsequently to the first synchronization signal burst set.

15. The apparatus of claim 14, wherein the instructions to perform the search procedure are executable by the processor to cause the apparatus to:
    receive the synchronization signal block using the first receive beam, wherein detecting the synchronization signal block is based at least in part on receiving the synchronization signal block using the first receive beam; and measure reference signals in a primary synchronization signal (PSS), a physical broadcast channel (PBCH) and a secondary synchronization signal (SSS) of the synchronization signal block.

16. The apparatus of claim 14, wherein the instructions to perform the measurement procedure are executable by the processor to cause the apparatus to:

measure reference signals in a secondary synchronization signal (SSS) in the second synchronization signal burst set.

17. The apparatus of claim 14, wherein the instructions are further executable by the processor to cause the apparatus to:

enter a measurement value for the second receive beam in a measurement database based at least in part on performing the measurement procedure.

18. The apparatus of claim 17, wherein the measurement value comprises a reference signal received power (RSRP) associated with the second receive beam and the transmit beam.

19. The apparatus of claim 14, wherein the instructions are further executable by the processor to cause the apparatus to:

perform a plurality of measurement procedures for each configured receive beam as part of a beam sweep based at least in part on detecting the synchronization signal block.

20. The apparatus of claim 14, wherein the instructions are further executable by the processor to cause the apparatus to:

perform a plurality of measurement procedures on a plurality of synchronization signal burst sets using a plurality of receive beams to measure the transmit beam, wherein the plurality of receive beams comprises the second receive beam, the plurality of synchronization signal burst sets comprises the second synchronization signal burst set, and the plurality of synchronization signal burst sets is transmitted subsequent to the first synchronization signal burst set.

21. The apparatus of claim 20, wherein the instructions are further executable by the processor to cause the apparatus to:

trigger a beam refinement procedure based at least in part on the plurality of measurement procedures.

22. The apparatus of claim 20, wherein the instructions are further executable by the processor to cause the apparatus to:

select a narrowband receive beam for the transmit beam based at least in part on a plurality of measurements taken for the plurality of measurement procedures.

23. The apparatus of claim 14, wherein the instructions are further executable by the processor to cause the apparatus to:

determine timing information for the synchronization signal block based at least in part on the search procedure, wherein performing the measurement procedure is based at least in part on the timing information.

24. The apparatus of claim 14, wherein the first receive beam and the second receive beam are each a pseudo-omni receive beam.

25. The apparatus of claim 14, wherein the instructions are further executable by the processor to cause the apparatus to:

detect the transmit beam of the base station based at least in part on performing the search procedure; and trigger the measurement procedure based at least in part on the detecting.

26. The apparatus of claim 14, wherein the instructions are further executable by the processor to cause the apparatus to:

determine there is no entry associated with the transmit beam for the second receive beam in a measurement database, wherein the measurement procedure is performed based at least in part on the determining.

27. An apparatus for wireless communication at a user equipment (UE), comprising:

means for performing a search procedure using a first receive beam;

means for detecting, based at least in part on performing the search procedure, a synchronization signal block corresponding to a transmit beam in a first synchronization signal burst set transmitted by a base station; and means for performing, to measure the transmit beam that was detected in the first synchronization signal burst set, a measurement procedure on a second synchronization signal burst set using a plurality of receive beams to select a second receive beam from the plurality of receive beams;

wherein the search procedure is performed during a first search occasion and the measurement procedure is performed prior to a second search occasion subsequent to the first search occasion, and wherein the second synchronization signal burst set is transmitted subsequently to the first synchronization signal burst set.

28. A non-transitory computer-readable medium storing code for wireless communication at a user equipment (UE), the code comprising instructions executable by a processor to:

perform a search procedure using a first receive beam;

detect, based at least in part on performing the search procedure, a synchronization signal block corresponding to a transmit beam in a first synchronization signal burst set transmitted by a base station; and perform, to measure the transmit beam that was detected in the first synchronization signal burst set, a measurement procedure on a second synchronization signal burst set using a plurality of receive beams to select a second receive beam from the plurality of receive beams;

wherein the search procedure is performed during a first search occasion and the measurement procedure is performed prior to a second search occasion subsequent to the first search occasion, and wherein the second synchronization signal burst set is transmitted subsequently to the first synchronization signal burst set.

* * * * *